United States Patent Office 3,533,811
Patented Oct. 13, 1970

3,533,811
PRINTING INK
Richard A. Clements, Rochelle Park, and Frank J. Iannuzzi, Berkeley Heights, N.J., assignors to Inmont Corporation, New York, N.Y., a corporation of Ohio
Continuation of application Ser. No. 494,260, Oct. 8, 1965. This application July 11, 1969, Ser. No. 845,663
Int. Cl. C09d 11/04
U.S. Cl. 106—24                                                                4 Claims

ABSTRACT OF THE DISCLOSURE

Water-base printing inks comprising water-miscible organic solvent, film forming resin soluble in the water miscible solvent, pigment, soluble protein, polymer latex, and a volatile base.

CROSS REFERENCE TO RELATED APPLICATION

This application is a continuation of U.S. application Ser. No. 494,260, filed Oct. 8, 1965, by Richard A. Clements and Frank J. Iannuzzi for Printing Ink.

This invention relates to intaglio, or gravure, printing inks. More particularly the invention relates to intaglio, or gravure, printing inks in which water is the major voltatile component.

The printing industry has long recognized that use of water instead of conventional volatile organic solvents, as the volatile component in ink, would have many advantages if suitable printing quality could be obtained. Among such advantages would be economy, less odor, less toxicity, less fire hazard, and easier and cheaper clean up of printing press and equipment.

Although there have been many disclosures of water base inks in the past there has been no great amount of printing with such inks. Water-base inks, according to the prior art are generally composed of water, water miscible organic solvent, a natural resin such as rosin, shellac, dammar, or tannin, an alkaline reacting compound, and a dispersing agent, e.g. casein. The prior art inks water-base inks have not been used to any appreciable extent as intaglio inks, because the speed at which these inks can be printed is below the average speed for publication gravure printing. Also, with prior water-base inks, printability, holdout, and trapping is poor. Additionally, conventional type intaglio ink pigments cannot be used in the prior art inks and the freeze-thaw properties of the inks are generally poor.

It is an object of the present invention to produce improved water-base inks for printing by the gravure method of printing. It is a further object of the invention to produce water-base inks that can be used in high speed multicolor printing by the gravure method. Also, the inks of the present invention have improved holdout, printability, trapping and freeze-thaw properties; and conventional type pigments can be used. Other objects and advantages will be apparent from the following description of the invention.

The inks of the present invention contain water, volatile water miscible organic solvent, pigment, soluble protein, a resin soluble in the volatile water miscible organic solvent, a latex of an addition polymer and a volatile base. Additionally, these various ingredients must be present in the novel inks within certain ratios to obtain desirable inks.

Volatile water-miscible organic solvents that are operable in the invention include the lower aliphatic alcohols, such as methyl alcohol, ethyl alcohol, isopropyl alcohol, and normal propyl alcohol and the lower alkylene glycols and their esters and ethers such as ethylene glycol, ethylene glycol mono acetate and ethylene glycol mono ethyl ether.

Soluble proteins in general are operable in the invention. These include casein, alpha protein, delta protein and zein. We especially prefer to use alpha protein as the soluble protein because it contributes to better overall ink properties. As is conventional in the art of using protein materials, we employ a small amount of a preservative to prevent decomposition of the protein. Such preservatives are usually phenols, a typical one being phenyl phenol, which may be incorporated as the sodium salt.

As the resin soluble in the volatile water miscible solvent we use a film-forming resin and we especially prefer to use a maleic acid modified rosin derivative having an acid number on the order of 140–150 and infinite solubility in alcohol or a cellulose derivative such as hydroxyethyl cellulose, or sodium carboxymethyl cellulose.

Latex polymers that are useful include the polymers and copolymers of ethylenically unsaturated monomers. Common ethylenically unsaturated monomers include vinyl acetate, vinyl chloride, acrylic acid, methacrylic acid, methyl methacrylate, methyl acrylate, ethyl acrylate, ethyl methacrylate and the like. We especially prefer acrylic polymer latices, e.g. Rhoplex AC–33 and Rhoplex B–15, because they produce inks that have good printing properties, have good holdout and are not adversely affected by temperature variations.

Thus, it is noted that the binder component of the present inks consist of a mixture of protein, resin and latex polymer. The ratio of pigment to total binder in the ink can vary over wide limits of from 1:1 up to 2.5:1.

The preferred volatile base, or alkaline material, is ammonia, because it is relatively inexpensive compared with other volatile bases and also because it is readily evaporated when the ink film dries. Other volatile bases include any of the lower alkyl amines such as methyl amine, dimethyl amine, trimethyl amine, ethyl amine, diethyl amine, triethyl amine, and the like. The amount of volatile base used must be sufficient only to maintain a slight alkalinity in the ink or to stabilize the ink. We have found a pH of 8.0 to 8.5 to be the preferred pH range. The percentage of volatile base should be kept as low as possible to minimize the effect of such materials on the copper cylinders used in gravure printing.

The ratios of other ingredients of the inks are also important and must be maintained within certain limits to obtain the optimum results. Usually the total solids of the inks, including pigment, resin, protein and latex polymer, will be between 35% and 50%. Total pigment content, which includes color pigment and fillers, such as clay, amounts to 50% to 70% of the total solids. The addition polymer solids constitutes 15% to 30% of the total solids. The soluble resin constitutes 2 to 6% of the total ink and soluble protein constitutes 2 to 6% of the total ink.

The following examples in which the parts are by weight are given to further illustrate the invention.

EXAMPLE 1—YELLOW INK

| | Parts |
|---|---|
| Water | 34.8 |
| Ammonium hydroxide, —28% NH$_3$ | 0.7 |
| Ethylene glycol monoethyl ether | 1.5 |
| Isopropanol | 4.0 |
| Resin (maleated rosin derivatives acid number 140–150) | 4.0 |
| Alpha protein | 3.0 |
| Rhoplex B–15 (a 46% solids latex of a copolymer of 65 parts ethyl acrylate, 30 parts methyl methacrylate and 5 parts acrylic acid) | 16.5 |
| Microcrystalline paraffin wax | 0.7 |

EXAMPLE 1—Continued

| | Parts |
|---|---|
| Benzidine yellow pigment | 4.0 |
| Chrome yellow pigment | 3.0 |
| Clay | 25.0 |
| Sodium o-phenyl phenate | 0.5 |
| Anti-foam agent (e.g. tributyl phosphate) | 1.0 |
| | 100.0 |

The resin, alpha protein and anti-foam agent are dissolved in a mixture of the ethylene glycol monoethyl ether, 0.5 part of ammonium hydroxide, and three fourths of the water, then the pigments, sodium o-phenylphenate and isopropanol are milled into the mix. Finally, the latex, microcrystalline wax, remainder of the water and ammonium hydroxide are added to give an ink having a pH of 8.2 and a viscosity of 34–38 seconds in a Zahn #3 cup at 77° F.

EXAMPLE 2—RED INK

| | Parts |
|---|---|
| Water | 44.7 |
| Ammonium hydroxide 28% | 0.8 |
| Ethylene glycol monoethyl ether | 1.5 |
| Isopropanol | 4.0 |
| Resin (maleated rosin derivative of Acid Number 140–150) | 4.0 |
| Alpha protein | 3.0 |
| Red pigment, Barium Lithol | 8.0 |
| White pigment, clay | 10.0 |
| Latex, Rhoplex B–15 | 21.0 |
| Microcrystalline wax | 0.7 |
| Sodium o-phenyl phenate | 0.5 |
| Anti-foam agent (e.g. tributyl phosphite) | 0.5 |

The resin and alpha protein were dissolved in a mixture of two-thirds of the water, the ammonium hydroxide, the ethylene glycol monoethyl ether and the anti-foam agent, then the pigments, isopropanol and sodium o-phenyl phenate are milled into the mixture. Finally, the latex, wax compound and the remainder of the water are added to give an ink having a viscosity of 21–25 seconds and a pH of 8.4–8.6.

EXAMPLE 3—BLUE INK

| | Parts |
|---|---|
| Water | 40.9 |
| Ammonium hydroxide | 0.8 |
| Ethylene glycol monoethyl ether | 1.5 |
| Anti-foam agent (tributyl phosphite) | 1.0 |
| Resin | 4.0 |
| Alpha protein | 3.0 |
| Phthalocyanine Blue Pigment | 5.0 |
| Carbon black | 0.3 |
| White pigment, clay | 17.0 |
| Sodium o-phenyl phenate | 0.5 |
| Isopropanol | 4.0 |
| Acrylic latex, Rhoplex B–15 | 20.0 |
| Microcrystaline wax | 0.7 |

The resin and alpha protein are dissolved in three fourths of the water, the ammonium hydroxide, the anti-foam agent and the ethylene glycol monoethyl ether, then the pigments, sodium o-phenyl phenate and isopropanol are milled into the mixture. Finally, the acrylic latex, the wax and the remainder of the water are added to give an ink having a viscosity of 27–30 sec. and a pH of 8.4–8.6.

EXAMPLE 4—BLACK INK

| | Parts |
|---|---|
| Water | 41.7 |
| Ammonium hydroxide | .8 |
| Ethylene glycol monoethyl ether | 1.5 |
| Anti-foam | 1.0 |
| Resin | 4.0 |
| Alpha Protein | 3.0 |
| Carbon black | 6.0 |
| Phthalocyanine Blue | 1.0 |
| Purple pigment (ZR–170) | 0.5 |
| White pigment (clay) | 14.0 |
| Sodium o-phenyl phenate | 0.5 |
| Isopropanol | 4.0 |
| Acrylic latex (e.g. Rhoplex B–15) | 20.0 |
| Microcrystalline wax | 0.7 |
| | 100.0 |

The resin and alpha protein were dissolved in three fourths of the water, the ammonium hydroxide, the ethylene glycol monoethyl ether and the anti-foam agent, then the pigments, the isopropanol and the sodium o-phenyl phenate are milled into the mixture. Finally, the acrylic latex, the wax and the remainder of the water are added to produce an ink having a viscosity of 24–27 seconds and a pH of 8.2 to 8.4.

The inks of Examples 1 to 4 were run as a series of four-color publication gravure process inks on a commercial press at printing speeds of 1000 to 1100 feet per minute on newsprint stock. The inks can be printed with good quality over a wide range of viscosities. While the viscosity range for satisfactory performance of conventional solvent type inks is very narrow, e.g. ±10% in the Zahn Viscosity reading, the inks of Examples 1 to 4 print with good quality at high speeds over a viscosity range of more than 100%. The inks have excellent freeze-thaw resistance at 30° F. (3–4 weeks) and excellent elevated temperature aging properties, e.g. 2 weeks at 120° F.

I claim:

1. A printing ink for paper comprising (1) water as the major volatile component, (2) minor amounts of isopropanol and ethylene glycol mono ethyl ether, (3) pigment, (4) alpha protein, (5) maleated rosin film forming resin soluble in (2) and having an acid number in the range of 140–150 and being infinitely soluble in alcohol, (6) a latex of a copolymer of 65 parts by weight ethyl acrylate, 30 parts by weight methyl methacrylate and 5 parts by weight acrylic acid, (7) ammonia, and wherein the total solids, consisting of pigment, protein, soluble resin and adidtion polymer comprise 35% to 50% of the total ink, the copolymer solids comprises about 15% to 30% of the total solids, the pigment to binder consisting of protein, resin, and latex copolymer ratio is within the limits of 1:1 to 2.5:1, the soluble resin comprises 2 to 6% of the total ink, alpha protein comprises 2 to 6% of the total ink, and the amount of ammonia is sufficient only to raise the pH to about 8.0 to 8.5, and wherein the weight ratio of resin to protein to latex is about 4 to about 3 to about 16.5–21.

2. The printing ink of claim 1 wherein the ink additionally contains .7 part by weight of microcrystalline paraffin wax.

3. The printing ink of claim 2 wherein the ink additionally contains effective amounts of an anti-foamant and a protein preservative.

4. The printing ink of claim 3 wherein the anti-foamant is tributyl phosphite and the protein preservative is sodium o-phenyl phenate.

References Cited

UNITED STATES PATENTS

| | | |
|---|---|---|
| 2,868,741 | 1/1959 | Chambers et al. |
| 3,244,558 | 4/1966 | Chan. |
| 3,311,489 | 3/1967 | Barbour. |

DONALD J. ARNOLD, Primary Examiner

J. B. EVANS, Assistant Examiner

U.S. Cl. X.R.

106—144, 146, 148; 260—8, 27, 29.6, 41